United States Patent [19]
Finezilber

[11] Patent Number: 6,105,831
[45] Date of Patent: Aug. 22, 2000

[54] PITCHER-STYLE REUSABLE BOTTLE HOLDER

[76] Inventor: Gedaliahu Finezilber, 18/5 Reut Street, Hod Hasharon, Israel

[21] Appl. No.: 09/357,658

[22] Filed: Jul. 20, 1999

[51] Int. Cl.[7] ...................................................... B67D 3/00
[52] U.S. Cl. .................. 222/475; 222/475.1; 222/481.5; 215/396; 220/769
[58] Field of Search ................................ 222/475, 475.1, 222/481.5; 215/396; 220/769, 222; 239/375

[56] References Cited

U.S. PATENT DOCUMENTS

| | | |
|---|---|---|
| 4,379,578 | 4/1983 | Schuler . |
| 4,427,126 | 1/1984 | Ostrowsky ............................. 215/307 |
| 4,660,876 | 4/1987 | Weldin et al. . |
| 4,721,220 | 1/1988 | Northup .................................. 215/307 |
| 4,747,502 | 5/1988 | Luenser .................................. 215/307 |
| 4,768,403 | 9/1988 | Bar-Noy . |
| 4,773,549 | 9/1988 | Avraham . |
| 4,821,372 | 4/1989 | Casiello . |
| 4,865,208 | 9/1989 | Lax et al. . |
| 4,896,913 | 1/1990 | Kennedy . |
| 5,104,010 | 4/1992 | Codorniz et al. ........................ 222/475 |
| 5,183,169 | 2/1993 | Grzych . |
| 5,487,482 | 1/1996 | Rocheleau . |

*Primary Examiner*—Kevin Shaver
*Assistant Examiner*—David Deal
*Attorney, Agent, or Firm*—Benjamin J. Barish

[57] ABSTRACT

A pitcher-style reusable bottle holder having a spout with internal lower thread flanges for attachment to the thread-flanged top of a bottle, external upper thread flanges for attachment of the original bottle cap, and a strategically designed handle which turns the bottle as a whole into a pitcher. The threads are in the form of flanges defining interrupted threads to reduce the surface area bearing on the mating thread flanges, thereby reducing the friction between the mating thread flanges and the torque needed to attach the handle to the bottle. There are spaces or gaps formed in the thread flanges for the controlled release of carbon dioxide gas when the original cap of the bottle is unscrewed from the bottle, and for the introduction of air from the atmosphere into the interior of the bottle when the bottle holder is applied and used for pouring liquid from the bottle. An open grasping portion depends outwardly and downwardly from the spout. The pouring spout may be oriented horizontally or vertically.

2 Claims, 2 Drawing Sheets

PITCHER-STYLE REUSABLE BOTTLE HOLDER

BACKGROUND OF THE INVENTION

1. Field of the Invention

The present invention relates to bottle holders, and, more specifically, to a pitcher-style bottle holders attaching to the new style thread flanges of a bottle, having a spout for pouring the contents of the bottle, and a strategically designed handle which turns the bottle as a whole into a pitcher. The original bottle cap is used to close the handle spout.

2. Description of the Related Art

Beverages such as soda are frequently sold in bottles which are too wide to allow for effective grasping during carrying and pouring. It is usually necessary to use two hands to pour the contents of the bottle. Additionally, people with weakened or partially disabled hands sometimes have difficulty carrying these bottles with one hand. The present invention has three important and unique advantages, in that, first, it allows unique horizontal pouring by converting the bottle as a whole into a pitcher, and second, it has an internally flange-threaded bottom interior specifically dimensioned to be easily screwed onto the thread flanges of current, new-style soda bottles. Thirdly, the spout of the invention is externally flange-threaded so that the original bottle cap from the bottle may be screwed onto the spout to seal it. Furthermore, both the thread flanges in the bottom interior of the invention and the external thread flanges on the spout have gaps or spaces formed therein so as to allow the controlled escape of carbon dioxide gas from the bottle as the original bottle cap is unscrewed from the spout of the invention.

To overcome the difficulties created by prior bottle top devices, several inventors have proposed various handles attaching to a bottle. However, no inventor within the knowledge of the present inventor has described a pitcher-style bottle handle attaching to the cap thread flanges of a bottle, having a horizontally oriented handle spout so that the bottle as a whole becomes an easily handled pitcher, providing for use of the original bottle cap to seal the handle spout, using threads in the form of a series of flanges to decrease friction between the mating surfaces, and having spaces or gaps formed in the thread flanges for the release of carbon dioxide gas when the original cap of the bottle is unscrewed from the handle spout.

One example of a handle is U.S. Pat. No. 4,379,578, issued to Heriberto Schuler on Apr. 12, 1983, describing a bottle holder having a top portion defining an aperture encircling the bottle's neck below the neck's flange, a lower portion encircling the body of the bottle, and a handle connecting the top portion with the bottom portion.

U.S. Pat. No. 4,660,876, issued to William B. Weldin et al., on Apr. 28, 1987, describes a bottle handle having a partial annulus flexible neck fitting around the bottle's neck, a handle integrally formed with the neck, and a partial annulus member for partially encircling the lower portion of the bottom. The lower partial annulus member attaches to the handle by mating male and female connectors.

U.S. Pat. No. 4,768,403, issued to Gideon Bar-Noy on Sep. 6, 1988, describes a bottle opener and handle having a pair of pivotally connected members, each having a semi-circular cutout facing the opposing cutout, and a handle portion. The semicircular cutouts are placed around the cap to assist in twisting off the cap, or around the neck of the bottle for use as a handle.

U.S. Pat. No. 4,773,549, issued to Yecheal A. Avraham on Sep. 27, 1988, describes a bottle holder. The holder includes a horizontal portion having a neck aperture for placing the holder on a bottle, and a smaller locking aperture for securing the holder around the bottle's neck. A front bottle support extends downward adjacent to the locking aperture, and a handle extends downward adjacent to the larger neck aperture.

U.S. Pat. No. 4,821,372, issued to Nicholas Casiello on Apr. 18, 1989, describes a container handle having a curved portion encircling most of the container's neck and neck flange, and a grasping portion fitting close to the container to minimize storage space requirements.

U.S. Pat. No. 4,865,208, issued to Harold Lax et al. on Sep. 12, 1980, describes a bottle support having a handle portion and a skirt portion. The skirt portion has a keyhole shaped opening in the top with a large portion opposite the handle for inserting the neck of the bottle, and a smaller portion adjacent to the handle for securing the bottle.

U.S. Pat. No. 4,896,913, issued to Steve J. Kennedy on Jan. 30, 1990, describes a bottle handle having a support strap encircling the lower part of the bottle, a handle extending upwards towards the neck, and a lock ring encircling most of the neck.

U.S. Pat. No. 5,183,169, issued to Stephen D. Grzych on Feb. 2, 1993, describes a bottle handle having a lower jacket portion for supporting the bottom of the bottle, a gripping portion extending upward from the jacket, and a neck encircling portion at the upper end of the gripping portion. The neck encircling portion has a locking tab for securing the neck.

U.S. Pat. No. 5,487,482, issued to Lawrence W. Rocheleau on Jan. 30, 1996, describes a handle and closure device for bottles. The closure device includes a spout having threads on each end, with the multi-shouldered bottom having top, internal threads for attaching to the bottle's top, and the top further having external threads for receiving a cap. The top may alternatively have a rotatably mounted cap with an aperture, with a corresponding aperture in the bottle. A handle extends outward from the spout. This patent teaches an elongate, double shouldered, complex structure having an excess of material which makes it far more expensive to make than the instant invention. The disclosed venting apertures are complex and difficult to manufacture, when compared to the uncomplicated gas-escape passages of the instant invention. The handle as taught in the patent is closed, thus increasing material expense, and formed at the top, which makes it hard to grasp and use with the bottle attached. Furthermore, this patent does not describe the horizontal orientation of the spout, or the use of flange-type threads to reduce friction, with gaps or spaces in the flanges for the release of carbon dioxide. More particularly, the thread flanges of the present invention are simply not taught or disclosed at all in the Rocheleau patent.

None of the above inventions and patents, taken either singularly or in combination, is seen to describe the instant invention as claimed. Thus a pitcher-style, reusable bottle handle solving the aforementioned problems is desired.

SUMMARY OF THE INVENTION

The invention is a pitcher-style reusable bottle holder intended primarily for use with soda bottles, although it could be used with any bottle having a threaded top and pourable contents. The invention includes a spout and an open grasping portion.

The spout has the approximate configuration of a tube. It has an internally flange-threaded bottom portion for attaching to the top of the bottle, and an externally flange-threaded top portion for receiving the bottle's original cap. The top portion of the spout may be oriented either vertically or horizontally.

The internal, female, lower threads and external, male, upper threads of the reusable holder are in the form of a series of flanges defining threads interrupted by gaps. The use of flange type threads instead of a single continuous thread reduces the surface area in contact with the mating threads of the bottle or bottle cap. The reduction in surface area reduces the friction between the two adjacent surfaces, thereby reducing the amount of torque needed to attach the bottle holder to the bottle, or to secure the bottle cap to the bottle holders spout. Additionally, the flanges provide openings through which carbon dioxide may escape as the bottle is being opened and through which air from the atmosphere may be sucked into the interior of the bottle when liquid is poured out.

The pitcher-style reusable bottle holder includes a spout with a bottom portion, and a handle, depending outwardly and downwardly from the spout. The bottle holder is screwed onto the bottle with the bottle in an upright, vertical attitude. The spout bottom portion has the horizontal, internal lower female thread flanges therewithin, which engage the outer, upper, external male thread flanges of the bottle top, its cap having been removed. These female flanges will preferably be arranged in horizontal rows, with gas-escape spaces defined therein. The flanges will be elongated in the direction of a screw thread. The resulting configuration is a helical arrangement of flanges around the threaded member defining a thread interrupted by gaps. Although any number of flanges will work, a preferred and suggested number is 12 to 24 flanges. The spout has a top portion, oriented horizontally or vertically, with external male thread flanges thereon, dimensioned and configured to receive the original bottle cap. When the spout top portion is oriented horizontally, the external male thread flanges are arrayed vertically, and also have gas-escape passages or spaces formed through them.

Accordingly, it. is a principal object of the invention to provide a pitcher-style reusable bottle holder for bottles containing pourable material.

It is another object of the invention to provide a pitcher-style reusable bottle holder attaching to the thread flanges of the bottle, thereby preventing the need for additional attachment structures.

It is a further object of the invention to provide a pitcher-style reusable bottle holder permitting the use of the original bottle cap to close the bottle holder's spout.

Still another object of the invention is to provide a pitcher-style reusable bottle holder having threads in the form of flanges arranged in a helical pattern, thereby reducing the friction between the mating threads, and the torque needed to attach the holder to the bottle, and the cap to the handle.

Yet a further object of the invention is to provide a reusable bottle handle having threads in the form of flanges arranged in a helical pattern, and the flanges having openings through which carbon dioxide may escape as the handle spout is being opened and through which air from the atmosphere may be sucked into the interior of the bottle when liquid is poured out.

It is an object of the invention to provide an improved pitcher-style reusable bottle holder which is inexpensive, dependable and fully effective in accomplishing its intended purposes.

According to the present invention, there is provided a pitcher-style reusable bottle holder for holding a bottle having an externally-threaded neck and an internally-threaded cap threadedly received on the neck, with the cap engaging an annular shoulder on the bottle neck when the cap is in its closed position, the threads of said neck and cap being interrupted to define gaps allowing a slow release of pressure within the bottle upon an initial rotation of the cap from its closed position when removing the cap from the bottle; the reusable bottle holder comprising: a body member formed with a bottle attaching section at one end for attaching to the neck of a bottle; a pouring spout at the opposite end of the body member and connected by an internal passageway to the attaching section; and a handle manually graspable by a user for holding and manipulating the bottle holder and a bottle when attached thereto; the attaching section of the body member being formed on its inner surface with internal threads mating with the external threads of a bottle neck for attaching the bottle holder to a bottle neck; the internal threads of the attaching section being interrupted to define gaps permitting air from the atmosphere to be sucked therethrough into the interior of the bottle when the attaching section is not tightened against the annular shoulder of the bottle neck and liquid is poured out from the bottle via the pouring spout; the pouring spout being formed on its outer surface with interrupted external threads and with an annular shoulder engageable by the cap to permit the cap, when removed from the bottle, to close the pouring spout.

In the preferred embodiment of the invention described below, the pouring spout has an axis approximately perpendicular to the axis of the attaching section.

These and other objects and features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a pitcher-style reusable bottle holder intended primarily for use with soda bottles and other beverage containers, but which may be used with any bottle having a threaded top for receiving a cap and which contains a pourable material. More specifically, the present invention is designed for use with the new soda bottles on the market which have thread flanges defining an interrupted helical thread formed at the top, onto which a bottle cap having interior thread flanges is screwed.

Figure 2:
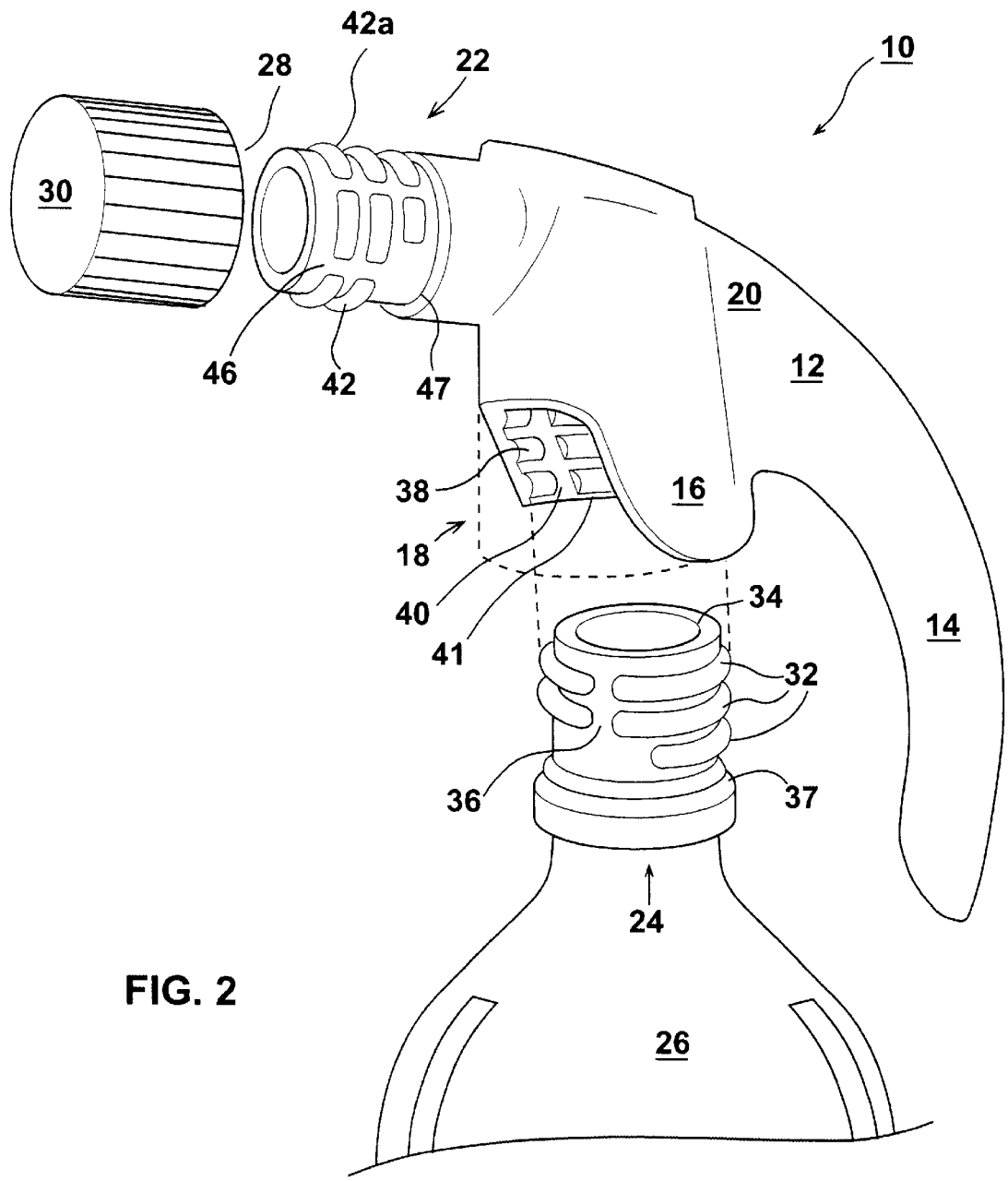
FIG. 2 is an exploded cutaway perspective view of a pitcher-style reusable bottle holder according to the present invention.

Referring to FIG. 2, the reusable bottle holder 10 includes a body member 12 and an open grasping portion or handle 14, depending outward and downward from body member 12. The body member 12 has the basic structure of a tube. It has a bottom attaching section 16, having internal thread flanges 18 defining an interrupted thread, and top pouring spout 20, having external thread flanges 22 defining an interrupted thread. The internal thread flanges 18 are dimensioned and configured to mate with the outer thread flanges 24 of soda bottle 26, and the outer thread flanges 22 are dimensioned and configured to mate with the inner thread flanges 28 of soda bottle cap 30. The pouring spout 20 at the opposite end of body member 12 from the attaching section 16 is connected to the attaching section by an internal passage for the liquid. Preferably, this passage is curved such that the axis of the pouring spout 20 is approximately perpendicular to the axis of attaching section 16, whereby the pouring spout is normally oriented horizontally, as illustrated, but may be oriented vertically.

As can be readily appreciated from the drawings, the holder structure of the invention is specifically dimensioned and configured such that, when contents are poured from the bottle, the holder allows unique horizontal pouring and thus turns the assembly as a whole into a pitcher, easily held by one hand, and easily used for controlled pouring of contents.

To best understand the friction reducing structure of the thread flanges 18,22, a brief description of the thread flanges 24 of a typical, new soda bottle 26 is helpful. The thread flanges 24 are structured as a helical pattern of ten flanges 32, beginning 1 mm. from the top 34 of the bottle 26, and ending 10 mm. from the top 34. The flanges 32 are separated by spaces 36, which are each 2 mm. wide to thus define a thread interrupted by spaces or gaps 36. An annular shoulder 37 is provided below the thread flanges 24. The bottle cap 30 when in its closed position, also engages the outer lip of the neck 34 to seal the contents of the bottle against leakage through the spaces 36. As known, upon the initial rotation of the cap from its closed position, the cap separates from the neck lip and from shoulder 37 allowing a slow release of the pressure within the bottle.

The internal thread flanges 18 of the bottle holder of the present invention are in the form of a helical arrangement of flanges 38. Each flange 38 is elongated, and oriented to lie parallel to the thread flanges 24 of bottle 26 and the thread flanges 28 of bottle cap 30. The helical arrangement of flanges 38 includes twelve to twenty four flanges 38, in a preferred and suggested embodiment; however, any number of flanges will work. All of the flanges 38 are of uniform size except the first flange, which may be twice as long as the other flanges 38, and slightly tapered, to facilitate engagement of the mating thread flanges. The use of additional flanges results in a greater number of spaces 40 between the flanges, resulting in less surface area contact between the thread flanges 18 and 24, and between the thread flanges 22 and 28. The reduced surface area contact reduces friction, which reduces the torque required to attach holder 10 to bottle 26, and to attach the original bottle cap 30 to holder 10. Additionally, the spaces in the flanges allow carbon dioxide gas to exit the bottle in a controlled fashion when the original bottle cap 30 is being unscrewed, and also allow air from the atmosphere to be sucked into the interior of the bottle when the holder is not tightened to space its end wall 41 from annular shoulder 37 of the bottle neck and liquid is being poured out.

The external threads 22 are similarly formed with thread flanges 42, preferably including a longer first flange 42a, interrupted by spaces or gaps 46 and terminating in an annular shoulder 47, corresponding to the flanges 32, spaces 36 and shoulder 37 of the bottle neck 34, such that the bottle cap 30 is cooperable with the pouring spout 22 and its external threads 22 in the same manner as with the bottle neck.

Figure 1:
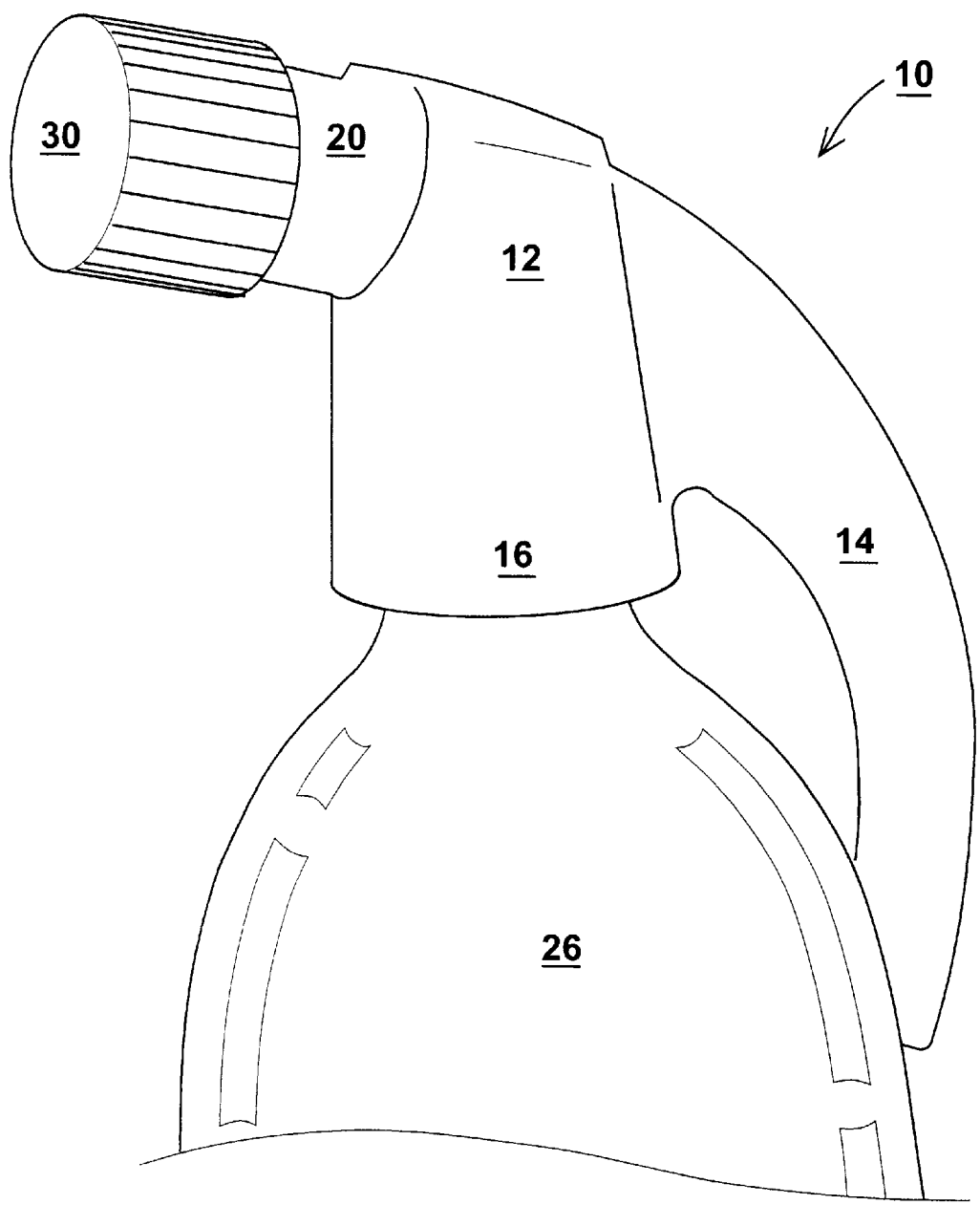
FIG. 1 is an environmental, perspective view of a pitcher-style reusable bottle holder according to the present invention.

The use of the invention is shown in FIGS. 1–2. The original cap 30 is first removed from bottle 26. Bottom section 16 of the body member 12 is attached to bottle 26 by securing thread flanges 18 over thread flanges 24. The original bottle cap 30 is secured over the pouring spout 20 by securing thread flanges 28 over thread flanges 22. The contents of the bottle 26 are now securely contained. To pour the contents of bottle 26, cap 30 is removed, the holder is slightly unthreaded to space its end 41 from annular shoulder 37 in the bottle neck, and handle 14 is grasped to lift the bottle 26 and pour the contents, in pitcher fashion. As described above, the spaces 36 in the bottle neck and 40 in the holder allow air from the atmosphere to be sucked into the interior of the bottle as the liquid contents are poured out. The original bottle cap 30 is then applied to the external threads 22 tightly engaging annular shoulder 47, and the holder 10 is rotated so that its end 40 firmly engages shoulder 37 of the bottle neck, thereby retaining the gas pressure within the bottle. When the bottle 26 is empty, holder 10 is removed from the bottle 26, original cap 30 is removed from the holder 10, and the handle 10 can be washed and used on another bottle 26.

It is to be understood that the present invention is not limited to the embodiment described above, but encompasses any and all embodiments within the scope of the following claims.

I claim:

1. A pitcher-style reusable bottle holder for holding a bottle having an externally-threaded neck and an internally-threaded cap threadedly received on the neck, with the cap engaging an annular shoulder on the bottle neck when the cap is in its closed position, the threads of said neck and cap being interrupted to define gaps allowing a slow release of pressure within the bottle upon an initial rotation of the cap from its closed position when removing the cap from the bottle; said reusable bottle holder comprising:

a body member formed with a bottle attaching section at one end for attaching to the neck of a bottle;

a pouring spout at the opposite end of the body member and connected by an internal passageway to said attaching section;

and a handle manually graspable by a user for holding and manipulating the bottle holder and a bottle when attached thereto;

said attaching section of the body member being formed on its inner surface with internal threads mating with the external threads of a bottle neck for attaching the bottle holder to a bottle neck;

said internal threads of the attaching section being interrupted to define gaps permitting air from the atmosphere to be sucked therethrough into the interior of the bottle when the attaching section is not tightened against the annular shoulder of the bottle neck and liquid is poured out from the bottle via said pouring spout;

said pouring spout being formed on its outer surface with interrupted external threads and with an annular shoulder engageable by the cap to permit the cap, when removed from the bottle, to close the pouring spout.

2. The bottle holder according to claim 1, wherein said pouring spout has an axis approximately perpendicular to the axis of said attaching section.

* * * * *